Dec. 21, 1954  C. McFAULL  2,697,459
POWER ACTUATED SHEARING TREE AND BRUSH CUTTER
Filed July 23, 1951  3 Sheets-Sheet 1

Clarence McFaull
INVENTOR.

BY *Clarence A. O'Brien*
*and Harvey B. Jacobson*
Attorneys

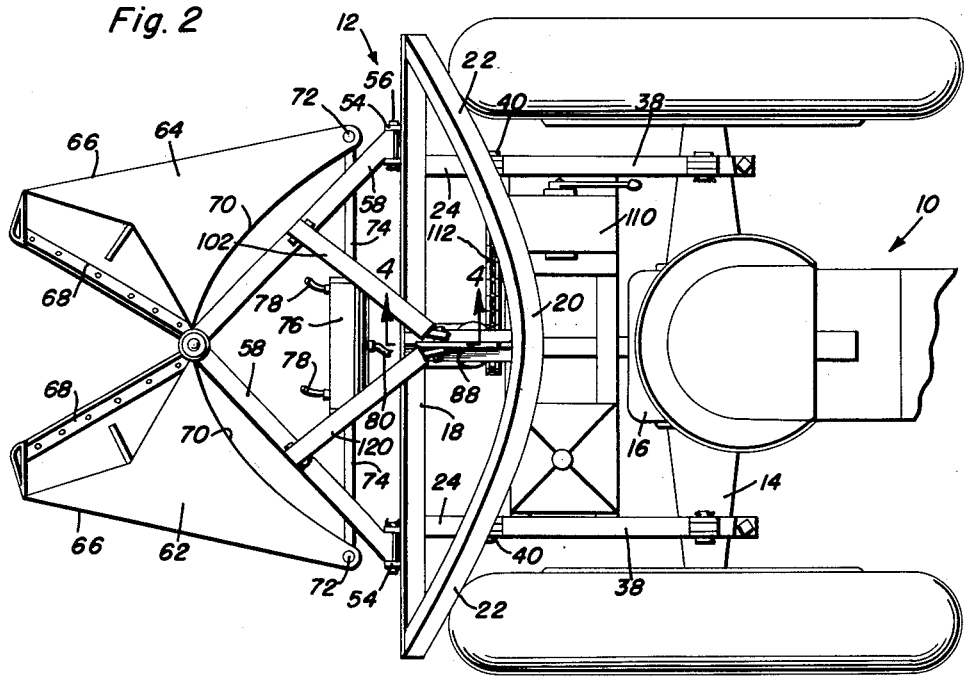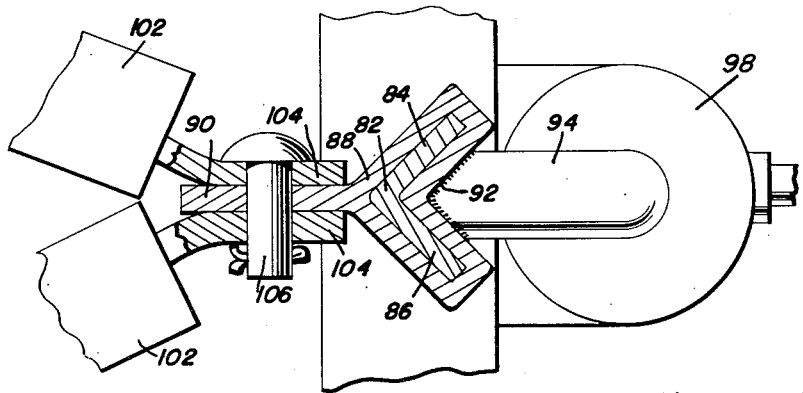

Dec. 21, 1954   C. McFAULL   2,697,459
POWER ACTUATED SHEARING TREE AND BRUSH CUTTER
Filed July 23, 1951   3 Sheets-Sheet 3
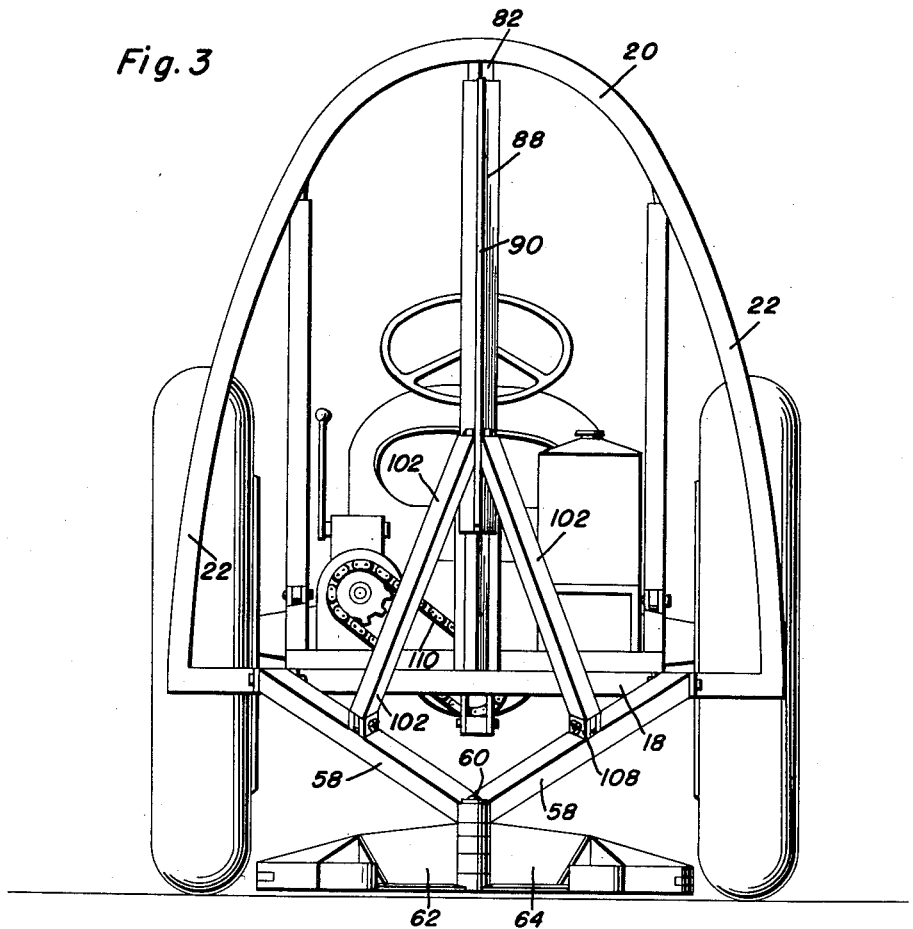
Clarence McFaull
INVENTOR.

United States Patent Office 2,697,459
Patented Dec. 21, 1954

2,697,459

POWER ACTUATED SHEARING TREE AND BRUSH CUTTER

Clarence McFaull, Bastrop, Tex.

Application July 23, 1951, Serial No. 238,103

14 Claims. (Cl. 144—34)

This invention comprises novel and useful improvements in a power actuated shearing tree and brush cutter and more specifically relates to a power operated shearing device for cutting trees and brush, which may be readily adjusted to cut the same at varying heights from the ground and which is adapted to be mounted as an attachment upon the rear portion of the tractor and the like and to be power operated by the same.

This invention is generally similar in its subject matter and purposes to that set forth in the prior patent to James K. Knight, Jr., Patent No. 2,214,334, of September 10, 1940; and constitutes an improvement over the construction disclosed and claimed in my co-pending application, Serial No. 630,236, filed November 23, 1945, for Power Actuated Shearing Tree and Brush Cutter and issued August 21, 1951 as Patent No. 2,565,242.

The primary purpose of the present invention is to provide an improved power operated shears for severing trees, brush and similar articles.

A further object of the invention is to provide a shearing device as set forth in the foregoing object in which the shears may be vertically adjusted to sever the articles at various heights as desired, and in which the vertical adjustment is effected with greater ease and certainty and in an improved manner.

Yet another object of the invention is to provide a power operated shear mechanism as set forth in the above mentioned objects which shall have an improved and exceedingly sturdy construction, especially as regards mounting of the device upon a tractor or other vehicle; the means for vertically adjusting the shears; and the means for supporting the shears during their operation.

These, together with the various ancillary features and objects of the invention, which will later become apparent as the following description proceeds, are attained by the present invention, a preferred embodiment of which has been illustrated, by way of example only, in the accompanying drawings, wherein:

Figure 2 is a top plan view of the construction shown in Figure 1;

Figure 3 is a rear elevational view of the tractor showing the shearing attachment mounted thereon;

Figure 1:
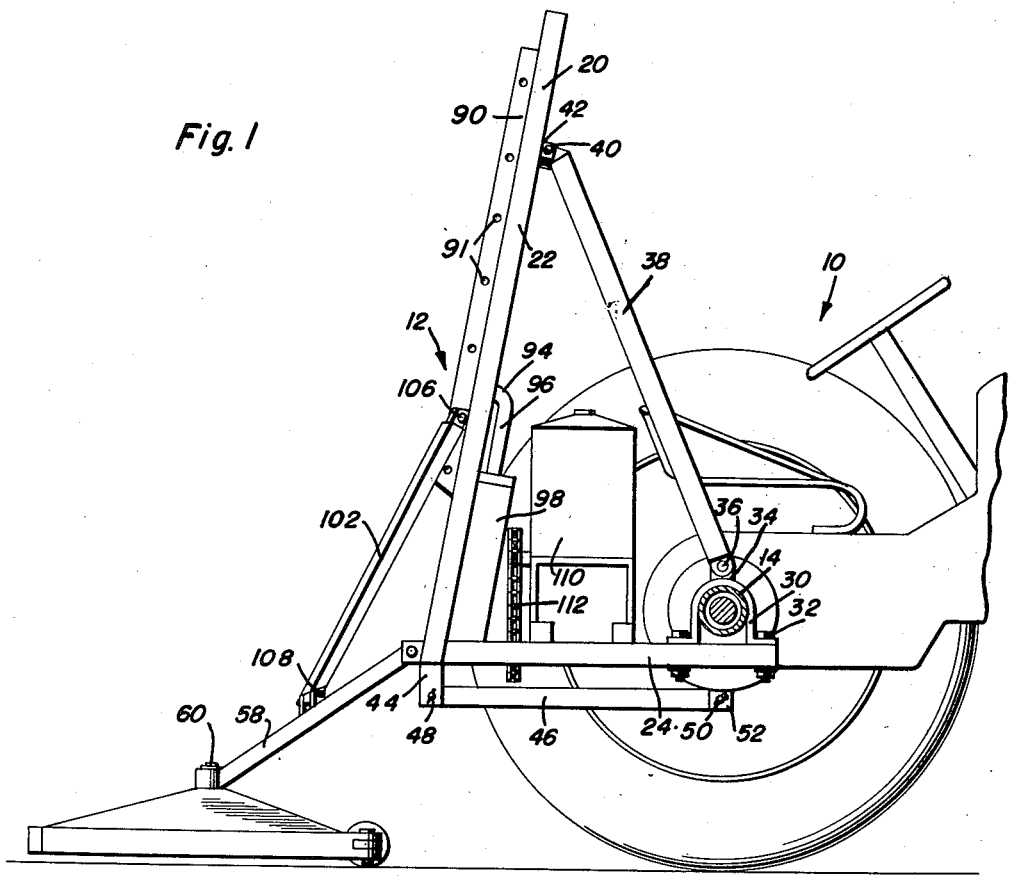
Figure 1 is a side elevational view showing one embodiment of shearing apparatus in accordance with this invention, the same being indicated as mounted upon the rear portion of a conventional form of tractor.

Referring now more specifically to the accompanying drawings, wherein like numerals designate similar parts throughout the various views, it will be seen that the numeral 10 designates generally a conventional form of farm tractor upon which the shearing device, indicated generally by the numeral 12 is adapted to be conveniently mounted either permanently or as a removable attachment as desired.

Although the shearing device 12 may obviously be mounted on various other vehicles such as trucks or the like, it has been shown mounted upon the rear portion of a tractor 10 for convenience and simplicity in illustrating the principles of the invention, and in order to show one satisfactory manner in which the invention is particularly adapted for use in conjunction with a tractor.

As shown in Figure 2, the tractor 10 is provided with the customary rear axle housings 14, and it is upon these housings and to the rear axle differential assembly housing 16 that the attachment 12 is conveniently and expeditiously mounted.

A supporting frame is provided consisting of a transverse beam 18 which is disposed horizontally and extends transversely of the tractor together with a bail 20 having side legs 22 whose lower ends are secured to and if desired may be integral with the ends of the bar or beam 18.

Mounting means are provided for detachably but fixedly and securely mounting the supporting frame, above described, upon the tractor 10. This mounting means comprises a pair of forwardly extending parallel bars 24 which at their rear ends are secured in any preferred manner to portions adjacent the ends of the transverse bar 18. At their forward ends, the members 24 are clamped as by U-shaped brackets 30 and bolts 32 to the rear axle housing 14. As will be readily seen from Figure 1, the members extend horizontally and from the underside of the axle housings and rearwardly thereof.

The U-shaped clamps 30 have lugs 34 upon their upper portions to which are pivotally connected as by pivot pins or bolts 36 upwardly and rearwardly extending brace rods 38 which at the upper extremities are pivoted as by pins or the like 40 to forwardly extending lugs 42 mounted upon the upper portions of the legs 22 of the bail 20. At substantially its mid-point, the transverse bar 18 is provided with a depending lug 44 and a further brace rod 46 is pivotally secured to this lug as by a pin 48, and at its forward end is pivotally secured by a pin 50 to a depending lug 52 below the differential housing 16.

It will thus be apparent that the support of the device is detachably but firmly and fixedly secured to the rear portion of a tractor for movement thereby.

Referring now more particularly to Figure 2, it will be apparent that the transverse bar 18 is provided, at least adjacent its ends, with pairs of integral, rearwardly extending hinge lugs 54 to which are pivotally connected as by hinge pins 56, a pair of support arms 58.

The hinge pins 56 are disposed in alignment with each other and in a horizontal plane, whereby the support arms 58 are pivoted for vertical movement about a horizontal axis.

The support arms 58 converge rearwardly of the device, and at their extremities are pivotally mounted upon the pivot member 60 which has a substantially vertically disposed axis. Likewise pivoted upon the member 60 are the hinge portions of the pair of shear blades 62 and 64. Thus, the shear blades 62, 64 and the rearward ends of the support arms 58 are pivoted upon a common pivot means. The shear blades 62 and 64 are movable relative to each other for swinging movement in a substantially horizontal plane. It is evident that in some instances one of the blades might be fixedly mounted upon the pivot pin 60 or relative to the support arms, with all of the swinging movement effected by the other blade. As illustrated however both of the blades are capable of swinging movement relative to each other and to the support arms.

The blade construction may be of any suitable conventional design, including that set forth in my above identified patent. Conveniently, each of the blades 62 of substantially triangular shape, as shown best in Figure 2, having a straight outer edge 66 with the apex of the triangular blades being hinged upon the pivot pin. The forward portion of each of the blades is provided with detachable and replaceable knife members 68 while the rear portions of the blades, upon their adjacent surfaces, may conveniently be recessed or curved as at 70 to provide therebetween a concave chamber. At their extremities or at their rear portions as regards the cutting edges of the blades, the blades 62 and 64 are pivotally connected as by pivoted ends 72 to a pair of piston rods 74 having pistons not shown, which are slidably disposed in a fluid pressure actuating cylinder 76. It will thus be seen that the operating means for the blades, namely the cylinder 76 and the piston rod 74 are supported entirely by the blades by the pivot pin 72, and are held within the rear edges of the blades in the above mentioned concave recess.

Any suitable source of fluid pressure may be utilized to energize the operating means or the fluid pressure cylinder assembly 76, and the fluid pressure conduits indicated at 78 in Figure 2 at opposite ends of the cylinder 76 in general indicate the manner in which the fluid pressure may be exhaused from the ends of the cylinder, while the conduit 80 at the mid-portion of the cylinder indicates the manner in which fluid pressure may be applied between the two pistons for driving the same and the piston rod outwardly from the cylinder.

Since any desired conventional and well-known type of fluid pressure and supply means may be employed, the details of such a system are not considered necessary for an understanding of this invention and therefore in the interests of simplicity of illustration have been omitted from the drawings.

As so far described, it will now be apparent that the shear blade assembly may be vertically adjusted by vertical pivoting movement about the horizontal axes 56 of the support arms to thereby position the shear blades at the desired elevation from the ground for severing trees, bushes or other articles.

In accordance with this invention, an improved mechanism is provided for effecting this vertical pivotal movement of the shear blade assembly.

Disposed upon the support frame-work, is an upwardly extending and somewhat inclined guide member 82. The latter has its lower end secured to and resting upon the transverse bar 18 at substantially the mid-portion thereof, and has its upper end secured to the mid-portion of the bail 20 as will be apparent from Figures 2 and 3. The guide 82 thus in effect constitutes also a reinforcing frame member for the support frame-work elements 18 and 20.

It is preferred to form the guide 82 L-shaped in cross-section as shown clearly in Figure 5, the guide thus having a pair of longitudinally extending integrally united angular disposed flanges 84 and 86. It is of course understood that the angular relation between the flanges may be of any desired magnitude, the perpendicular arrangement of Figure 5 being found to be both inexpensive and satisfactory.

As will be further apparent from Figure 1, this guide member is inclined slightly forwardly of the device and is disposed substantially in the vertical central longitudinal plane of the tractor upon which the device is mounted.

A slide is mounted upon the guide for longitudinal reciprocation thereon. This slide comprises a sleeve like casing or housing indicated generally by the numeral 88, and which also is of an L-shaped configuration in order to snugly and slidably embrace the L-shaped guide member 82. Upon what may be termed as a rear surface, the slide 82 is provided with a longitudinally extending laterally disposed integral rib or fin 90, which as shown in Figure 1 is provided with a plurality of longitudinally disposed apertures 91 therein for a purpose which will be later set forth.

Figure 4:
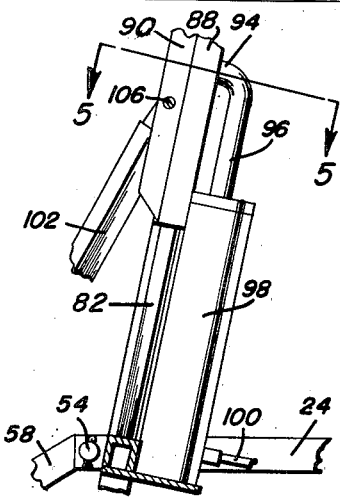
Figure 4 (Sheet 1) is a vertical longitudinal section detail taken upon an enlarged scale substantially upon the plane indicated by the section line 4—4 of Figure 2; and, Figure 5 (Sheet 2) is a horizontal sectional detail view taken upon an enlarged scale substantially upon the plane indicated by the section line 5—5 of Figure 4.

Welded or otherwise fixedly and rigidly attached to the slide 88 as at 92 is the laterally extending arm 94 of the piston rod 96, see also Figures 1 and 4, having a piston, not shown, but slidably received in a fluid pressure operating cylinder 98. This cylinder is suitably mounted upon and secured to the supporting framework previously mentioned in any desired manner, and is provided with a fluid pressure supply conduit 100 whereby the piston therein may be reciprocated causing reciprocation of the piston rod 96 and consequently vertical reciprocation of the slide 88 upon the guide 82.

Connecting links are provided for connecting the rib 90 of the slide with the support arms 58. This connecting means, see also Figure 5, comprises a pair of connecting bars 102 each having flattened ears 104 which are apertured for the reception of a pivot pin 106, and which embrace and are secured to the rib 90 by positioning the pivot pin 106 through one of the selected apertures 94 in the rib. At their lower ends, the members 102 are pivotally connected to upstanding brackets 108 integrally formed upon the support arms 58.

It will now be apparent that when the slide is moved longitudinally of the guide 82, the connecting members 102 will cause vertical pivotal movement of the support arms 58 and of the shear mechanism attached thereto. During this vertical pivoting movement, it is evident that the shear mechanism may be continuously operated without interference by its vertical adjustment.

As above mentioned, fluid pressure may be supplied from any suitable source by the conduit 100 to the fluid pressure cylinder 98 to effect vertical adjustment of the shear mechanism; and by the conduit 80 to the operating cylinder 76 to operate the shear blades. As shown in Figure 1, a fluid pressure producing source indicated as a housing or tank 110 may be conveniently mounted upon any suitable order of the supporting frame-work of the device and may contain a fluid pressure pump, not shown, which may be operated or driven by a sprocket chain 112 in any desired manner from the power take-off of the tractor 10.

From the foregoing, the construction and operation of the device will be readily understood and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having described the invention, what is claimed as new is:

1. A tree and brush cutter comprising a support, a pair of shear blades, vertically disposed pivot means connecting said blades for relative substantially horizontal swinging movement, shear operating means for causing relative swinging movement of said blades, a pair of converging support arms for said blades pivoted to said support for vertical pivotal movement thereon, an upwardly extending guide mounted upon and comprising a reinforcement for said support, a slide mounted on said guide, means connected to said slide for imparting vertical pivotal movement to said support arms and blades, actuating means for said slide, said support arms being pivoted to said support on an axis intersecting the longitudinal axis of said guide.

2. The combination of claim 1 wherein said support arms are secured to said pivot blades upon the pivot means thereof.

3. The combination of claim 1 wherein said connecting means is pivoted to said support arms.

4. The combination of claim 1 wherein said actuating means is connected to said slide.

5. The combination of claim 1 wherein said slide comprises a sleeve embracing said guide.

6. The combination of claim 1 wherein said slide comprises a sleeve embracing said guide, a longitudinal rib on said slide, said connecting means being pivoted to said rib.

7. The combination of claim 1 wherein said operating means is carried by and mounted upon said shear blades.

8. The combination of claim 1 wherein said guide comprises a standard having longitudinally extending angularly disposed flanges, said slide having portions slidably disposed upon said flanges.

9. The combination of claim 1 wherein said guide comprises a standard having longitudinally extending angularly disposed flanges, said slide having portions slidably disposed upon said flanges, said slide comprising a sleeve-like casing embracing and entirely surrounding said guide.

10. A tree and brush cutter comprising a support, a pair of shear blades, vertically disposed pivot means connecting said blades for relative substantially horizontal swinging movement, shear operating means for causing relative swinging movement of said blades, a pair of converging support arms for said blades pivoted to said support for vertical pivotal movement thereon, an upwardly extending guide on said support, a slide mounted on said guide, means connected to said slide for imparting vertical pivotal movement to said support arms and blades, actuating means for said slide, mounting means for securing said support upon the axle housing of a tractor, said support arms being pivoted to said support on an axis intersecting the longitudinal axis of said guide.

11. A tree and brush cutter comprising a support, a pair of shear blades, vertically disposed pivot means connecting said blades for relative substantially horizontal swinging movement, shear operating means for causing relative swinging movement of said blades, a pair of converging support arms for said blades pivoted to said support for vertical pivotal movement thereon, an upwardly extending guide on said support, a slide mounted on said guide, means connected to said slide for imparting vertical pivotal movement to said support arms and blades, actuating means for said slide, said support including a transverse bar intersecting the longitudinal axis of said guide, said support arms being pivoted to said bar, said guide having one end supported on said bar, a bail having its ends secured to the ends of said bar and its mid-portion secured to the other end of the guide.

12. The combination of claim 11 including mounting means securing said bar and said bail to the axle housing of a tractor.

13. The combination of claim 10 including brace means connected to said support and adapted for attachment to the differential housing of a tractor.

14. The combination of claim 11 including brace means connected to said support and adapted for attachment to the differential housing of a tractor.

References Cited in the file of this patent

UNITED STATES PATENTS

| Number | Name | Date |
| --- | --- | --- |
| 1,039,338 | Wallace | Sept. 24, 1912 |
| 2,214,334 | Knight | Sept. 10, 1940 |
| 2,366,909 | Johnson | Jan. 9, 1945 |
| 2,529,934 | Gracey et al. | Nov. 14, 1950 |
| 2,560,641 | Goodlet | July 17, 1951 |
| 2,565,252 | McFaull | Aug. 21, 1951 |
| 2,590,011 | Hawkins | Mar. 18, 1952 |